COX & TROWBRIDGE.
Whiffletree.
No. { 2,515. / 33,519. }  Patented Oct. 22, 1861.
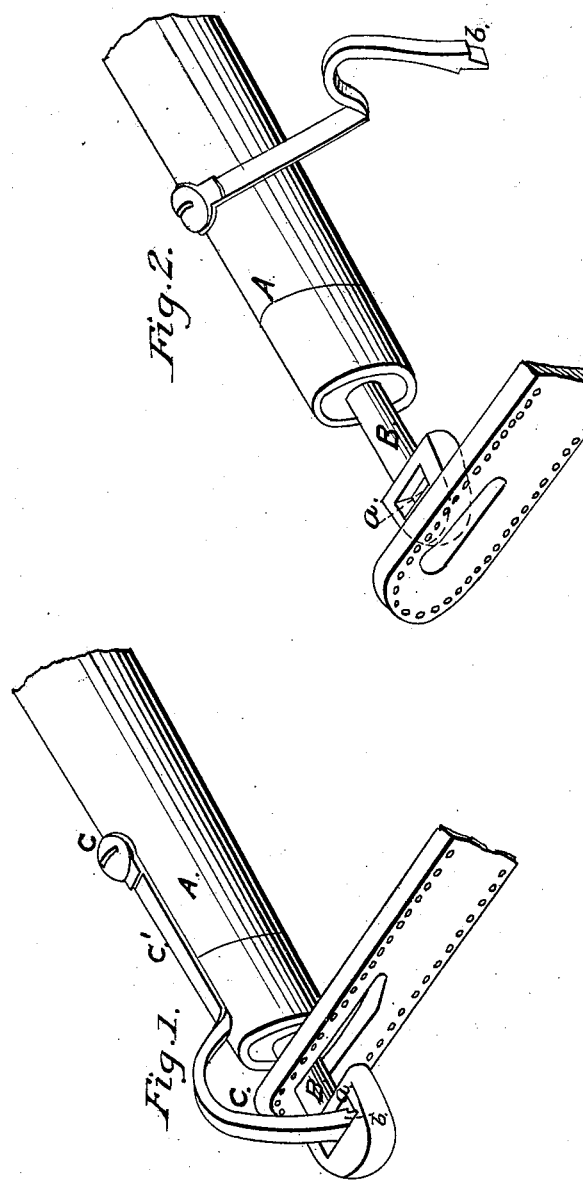
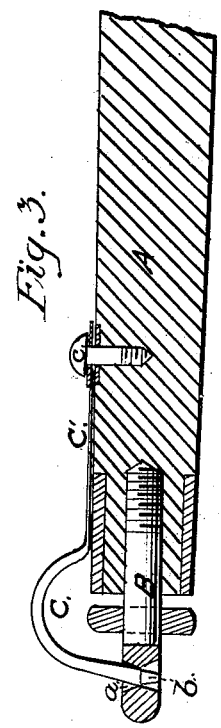

UNITED STATES PATENT OFFICE.

S. W. COX AND J. H. TROWBRIDGE, OF NEW HAVEN, CONNECTICUT.

IMPROVED TRACE-FASTENING.

Specification forming part of Letters Patent No. 33,519, dated October 22, 1861.

*To all whom it may concern:*

Be it known that we, S. W. COX and J. H. TROWBRIDGE, of the city and county of New Haven, and State of Connecticut, have invented a new and useful Improvement in Trace-Fastenings of Whiffletrees; and we do hereby declare that the following is a full, clear, and exact description of the same, reference being had to the accompanying drawings, forming part of this specification, in which—

Figure 1 is a perspective view of our invention in operation; Fig. 2, a perspective view of the same out of operation. Fig. 3 is a vertical longitudinal section of it in operation.

Similar letters of reference in each of the several figures indicate corresponding parts.

Our invention relates to an improvement in that character of trace-fastening which attaches permanently by one end to the top of the whiffletree and confines the trace to the whiffletree by its other end entering an eye in the journal of the whiffletree.

The nature of our invention consists in the combination, with a whiffletree and the eye in its journal, of a loop so constructed and pivoted to the whiffletree that it combines the two following functions, to wit: First, by reason of its elasticity it is capable of being raised or lowered, and thus of being sprung into and out of the journal of the whiffletree, and, second, by reason of its pivotal connection to the whiffletree it is capable of being moved in the path of a horizontal circle either for the purpose of effecting an insertion of its free locking end into the eye of the journal of the whiffletree or for the purpose of moving it out of the way of the trace after said end has been withdrawn from said eye.

Our improvement possesses several advantages over other substitutes for the leather thongs commonly used for trace-fastenings, to wit: First, it is lighter and cheaper and safer and is applicable to the ordinary whiffletree without the trouble of removing any part, except the strap or thong, which our invention takes the place of; second, the spring being hung on a pivot, it can, when open, be thrown laterally out of the way, leaving the journal perfectly free to hitch or unhitch the trace with perfect ease; third, by providing the pivot it relieves the spring from a great part of its usual labor. It will be observed that the spring has to be raised but a short distance—just enough to clear the eye of the journal. Consequently the strain on the spring-loop is but light, and therefore the loop is less liable to break than those spring-fastenings which have not an axial pivot and require to be raised a much greater height, and, fourth, or fastening is perfectly smooth, and with it there is no chance for the reins to get under the spring or any part of the fastener, and thus the obviation of a difficulty often experienced with other fasteners in use is effected, and, finally, there are no projections standing out for the horse's tail to catch upon, and therefore the trimming out of the hairs of the horse's tail is prevented. Very often horses' tails are completely sheared off by some of the spring contrivances in use on the end of the whiffletree.

To enable others skilled in the art to make and use our invention, we will describe its construction and operation, with reference to the drawings.

A is a portion of a whiffletree, and B the journal of the same. Through the journal a vertical slot *a* is formed, as usual.

C is a metal loop with a spring shank or extension C'. The free end of the loop has a stop or shoulder *b* formed on it, as shown. The spring-extension attaches by means of an axial pivot *c* to the top of the whiffletree.

To apply the trace to the journal and confine it, insert the journal B through the slot of the trace and then turn the loop round from the position shown in Fig. 2 to the position shown in Fig. 1. When the free end of the loop strikes the journal, the spring end yields upwardly sufficiently to allow said end to spring into the slot or eye of the journal. To remove the trace, raise the free end of the loop out of the eye and move the loop on its axial pivot to the position shown in Fig. 2, and then slip off the trace in the usual manner.

Having thus fully described our invention, what we claim as new, and desire to secure by Letters Patent, is—

The trace-fastening C C' c, constructed, applied, and operating as herein described, in combination with a whiffletree and the eye in the journal thereof, as and for the purposes herein set forth.

Witness our hands and seals, in the matter of our improvement in trace-fastenings, this 17th day of September, 1861.

S. W. COX. [L. S.]
  J. H. TROWBRIDGE. [L. S.]

Witnesses:
 R. H. GOLDSMITH,
 A. W. GUNN.